(12) United States Patent
Liu et al.

(10) Patent No.: US 10,239,043 B2
(45) Date of Patent: Mar. 26, 2019

(54) VINYLIDENE CHLORIDE COPOLYMER-BASED CARBON MOLECULAR SIEVE ADSORBENT COMPOSITIONS AND PROCESSES THEREFOR

(71) Applicant: Dow Global Technologies LLC, Midland, MI (US)

(72) Inventors: Junqiang Liu, Midland, MI (US); Douglas E. Beyer, Midland, MI (US); Edward M. Calverley, Midland, MI (US); Chan Han, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 74 days.

(21) Appl. No.: 15/320,334

(22) PCT Filed: Jun. 22, 2015

(86) PCT No.: PCT/US2015/036866
§ 371 (c)(1),
(2) Date: Dec. 20, 2016

(87) PCT Pub. No.: WO2016/003680
PCT Pub. Date: Jan. 7, 2016

(65) Prior Publication Data
US 2017/0203276 A1    Jul. 20, 2017

Related U.S. Application Data

(60) Provisional application No. 62/018,828, filed on Jun. 30, 2014.

(51) Int. Cl.
*B01D 53/02* (2006.01)
*B01J 20/20* (2006.01)
(Continued)

(52) U.S. Cl.
CPC ............ *B01J 20/20* (2013.01); *B01D 53/02* (2013.01); *B01D 67/0067* (2013.01); *B01D 71/021* (2013.01); *B01J 20/2808* (2013.01); *B01J 20/28016* (2013.01); *B01J 20/28023* (2013.01); *B01J 20/28038* (2013.01); *B01J 20/28069* (2013.01); *B01J 20/3007* (2013.01); *B01J 20/3021* (2013.01); *B01J 20/3028* (2013.01); *B01J 20/3078* (2013.01); *C01B 32/00* (2017.08); *C01B 32/306* (2017.08); *C01B 32/382* (2017.08); *B01D 53/228* (2013.01); *B01D 69/02* (2013.01); *B01D 71/34* (2013.01); *B01D 2253/102* (2013.01); *B01D 2253/116* (2013.01); *B01D 2253/308* (2013.01); *B01D 2253/311* (2013.01); *B01D 2256/10* (2013.01); *B01D 2256/24* (2013.01); *B01D 2256/245* (2013.01); *B01D 2257/102* (2013.01); *B01D 2257/504* (2013.01);
(Continued)

(58) Field of Classification Search
CPC ........ B01D 2253/102; B01D 2253/116; B01D 2253/308; B01D 2253/311; B01D 2256/10; B01D 2256/24; B01D 2256/245; B01D 2257/102; B01D 2257/504; B01D 2257/7022; B01D 2257/7025; B01D 2325/023; B01D 53/02; B01D 53/228
See application file for complete search history.

(56) References Cited

U.S. PATENT DOCUMENTS

| 5,670,124 A * | 9/1997 | Itoga ...................... B01D 53/02 423/235 |
| 2007/0160789 A1* | 7/2007 | Merical .................... B32B 7/02 428/35.7 |
| 2014/0013942 A1* | 1/2014 | Wojtowicz ............... B01J 20/20 95/95 |

FOREIGN PATENT DOCUMENTS

| NL | 7111508 A | 10/1971 |
| WO | 8905691 A1 | 6/1989 |

OTHER PUBLICATIONS

Office Action pertaining to EP 15 741 654.6 dated Nov. 28, 2017, 8 pages.
(Continued)

*Primary Examiner* — Christopher P Jones
(74) *Attorney, Agent, or Firm* — Dinsmore & Shohl LLP

(57) ABSTRACT

Novel carbon molecular sieve (CMS) compositions comprising carbonized vinylidene chloride copolymer having micropores with an average micropore size ranging from 3.0 to 5.0. These materials offer capability in separations of gas mixtures including, for example, propane/propylene; nitrogen/methane; and ethane/ethylene. Such may be prepared by a process wherein vinylidene chloride copolymer beads, melt extruded film or fiber are pretreated to form a precursor that is finally carbonized at high temperature. Preselection or knowledge of precursor crystallinity and attained maximum pyrolysis temperature enables preselection or knowledge of a average micropore size, according to the equation ?=6.09+ (0.0275×C)−(0.00233×T), wherein ? is the average micropore size in Angstroms, C is the crystallinity percentage and T is the attained maximum pyrolysis temperature in degrees Celsius, provided that crystallinity percentage ranges from 25 to 75 and temperature in degrees Celsius ranges from 800 to 1700. The beads, fibers or film may be ground, post-pyrolysis, and combined with a non-coating binder to form extruded pellets, or alternatively the fibers may be woven, either before or after pre-treatment, to form a woven fiber sheet which is thereafter pyrolyzed to form a woven fiber adsorbent.

10 Claims, No Drawings

(51) Int. Cl.
*B01J 20/28* (2006.01)
*B01J 20/30* (2006.01)
*B01D 67/00* (2006.01)
*B01D 71/02* (2006.01)
*C01B 32/00* (2017.01)
*C01B 32/306* (2017.01)
*C01B 32/354* (2017.01)
*B01D 53/22* (2006.01)
*B01D 69/02* (2006.01)
*B01D 71/34* (2006.01)

(52) U.S. Cl.
CPC ............... *B01D 2257/7022* (2013.01); *B01D 2257/7025* (2013.01); *B01D 2325/023* (2013.01); *B01J 2220/4812* (2013.01); *C01P 2006/14* (2013.01); *C01P 2006/16* (2013.01); *Y02C 10/08* (2013.01); *Y02C 20/20* (2013.01); *Y02P 20/152* (2015.11); *Y02P 20/156* (2015.11)

(56) References Cited

OTHER PUBLICATIONS

Fernandez-Morales, et al., Adsorption Capacity of Saran Carbons At High Temperatures and Under Dynamic Conditions, Carbon, vol. 22, No. 3, pp. 301-304, 1984, Great Britain.

Centeno et al. "Carbon Molecular Sieve Gas Separation Membranes based on Poly(Vinylidene Chloride-Co-Vinyl Chloride)," Carbon (2000) 38, 1067-1073.

Da Silva et al., "Adsorption Equilibria and Kinetics for Propylene and Propane over 13X and 4A Zeolite Pellets", Ind. Eng. Chem. Res. (1999) 38, 2051-2057.

International Search Report and Written Opinion pertaining to PCT/US2015/036866 dated Sep. 30, 2015.

International Preliminary Report on Patentability pertaining to PCT/US2015/036866 dated Jan. 3, 2017.

Lamond et al., "6 Å Molecular Sieve Properties of SARAN-type Carbons," Carbon (1965) 3, 59-63.

Laredo et al., "Adsorption Equilibrium and Kinetics of Branched Octane Isomers on a Polyvinylidene Chloride-Based Carbon Molecular Sieve," Energy Fuels (2008) 22 (4) 2641-2648.

Liu et al., "High Throughput Development of One Carbon Molecular Sieve for Many Gas Separations", Microporous Mesoporous Mater. (2015) 206, 207-216.

Staudt-Bickle, "Olefin/Paraffin Gas Separations with 6FDA-based Polyimide Membranes", J. Membr. Sci. (2000) 170 (2), 205-214.

* cited by examiner

VINYLIDENE CHLORIDE COPOLYMER-BASED CARBON MOLECULAR SIEVE ADSORBENT COMPOSITIONS AND PROCESSES THEREFOR

The present application claims the benefit of U.S. Provisional Patent Application Ser. No. 62/018,828, filed Jun. 30, 2014, entitled "CARBONIZED VINYLIDENE CHLORIDE COPOLYMER-BASED MOLECULAR SIEVE ADSORBENT COMPOSITIONS AND PROCESSES THEREFOR," which is incorporated herein by reference in its entirety.

The present invention relates to the field of molecular sieve compositions. More particularly, it relates to carbon molecular sieve compositions based on vinylidene chloride copolymers.

Researchers have sought means to separate gas mixtures, either for use as starting materials or as products, for many years. Materials that have been of particular interest as means of such separations have been carbon molecular sieves (CMSs). These CMSs may be prepared from a variety of resins and are pyrolyzed at various temperatures and/or under various conditions. The pyrolysis reduces the resins to pure carbon, but maintains at least some porosity, in the form of micropores, in the pyrolyzed product. It is known that under some conditions the pyrolysis may shrink micropores to a desirable average size. The CMSs thus formed may then be employed in conventional gas separations equipment, such as packed beds, columns, and the like, where the micropore size determines which gas in a gas mixture is adsorbed and which is not. Adsorption and desorption techniques may be alternated to carry out the separation, according to, for example, conventional pressure swing or temperature swing adsorption methods.

However, there is a particular challenge in the art to prepare CMSs having micropores of the correct size(s) for certain particular separations. Since the use of CMSs to accomplish separations assumes that the micropores are at least as large as, or larger than, the specified molecule that will enter the micropores, it is necessary to know the "size" of the molecule. Researchers have found different ways to determine that molecular size. One commonly employed approach has been to determine a given molecule's "kinetic diameter." A reference listing a variety of these kinetic diameters, based upon their use in zeolite applications, is D. W. Breck, *Zeolite Molecular Sieves: Structure, Chemistry and Use*, John Wiley & Sons, Inc. (New York, N.Y. 1974), 636, and these determinations are frequently used even with respect to non-zeolite, carbon molecular sieves that are known to have slit-shaped pores. In view of the above and for purposes hereof, then, the following kinetic diameters, taken from the Breck reference cited supra, are used herein as the representative molecular diameters for the following molecules: $CO_2$ (3.3 Angstroms, Å), $N_2$ (3.64 Å), $CH_4$ (3.8 Å), $C_2H_4$ (3.9 Å), $C_3H_8$ (4.3 Å), i-$C_4H_{10}$ (5.0 Å), $SF_6$ (sulfur hexafluoride) (5.5 Å), and i-$C_8H_{18}$ (neopentane) (6.2 Å). However, because that reference table lacks a kinetic diameter for ethane, and the kinetic diameter given therein for propylene is believed by at least some researchers to be inaccurate for CMS materials per se, the Lennard-Jones collision diameters are used herein, instead of the Breck kinetic diameters, for those two materials. These Lennard-Jones collision diameters are, respectively, $C_2H_6$ (4.1 Å), and $C_3H_6$ (4.0 Å). See, for example, Staudt-Bickel C., Koros W. J., "Olefin/paraffin gas separations with 6FDA-based polyimide membranes," *J. Membr. Sci.* (2000) 170 (2), 205-214 for further discussion. The kinetic diameters and Lennard-Jones collision diameters are referred to together as "representative molecular diameters."

A particular separation of interest to many for commercial application is the separation of propane ($C_3H_8$) and propylene ($C_3H_6$). Because the representative molecular diameter of $C_3H_8$ is 4.3 Å, and of $C_3H_6$ is 4.0 Å, the average micropore size of a suitable separation CMS for a mixture of these two gases desirably falls somewhere within the range from 4.0 Å to 4.3 Å. As used herein, "average micropore size" refers to the average micropore opening, i.e., width of a theoretical one-dimensional slit-pore, regardless of the possible actual overall configuration of the micropore. Additional desirable separations may include carbon dioxide ($CO_2$, representative molecular size 3.3 Å) and nitrogen ($N_2$, 3.64 Å); $N_2$ and methane ($CH_4$, 3.8 Å); ethylene ($C_2H_4$, 3.7 Å) and ethane ($C_2H_6$, 4.1 Å); and n-butane (n-$C_4H_{10}$, 4.3 Å) and iso-butane (i-$C_4H_{10}$, 5.0 Å). All such separations require an average micropore size, as defined, generally ranging from approximately 3.0 Å to approximately 5.0 Å.

Examples of the CMS materials that have been found to be useful for certain separations within the representative molecular diameter range of from approximately 3.0 Å to approximately 5.0 Å include the material disclosed in WO 2012/106218 A2 (PCT/US2012/023059, Petruska, et al.). That patent application describes a carbon pyrolyzate adsorbent having a carbon dioxide ($CO_2$) capacity greater than 105 cubic centimeters per gram ($cm^3/g$) at a pressure of 1 bar (0.1 megapascal, MPa) and a temperature of 273 Kelvin (K, 0 degrees Celsius, °C.), formed from a polyvinylidene chloride-based polymer or copolymer, or other suitable resin. The separation described therein, however, is based on the fact that the $CO_2$ molecule has a stronger affinity for the carbon matrix than do certain other molecules, such as nitrogen ($N_2$). Thus, this is not a molecular sieving effect, and average micropore size is, in fact irrelevant. In view of this fact the micropores disclosed by Petruska et al. may actually be of any size that is larger than the size of the $CO_2$ molecule being adsorbed therein (3.3 Å).

Another separation based upon molecular size is disclosed in Lamond T. G., et al., "6 Å molecular sieve properties of SARAN-type carbons," *Carbon* (1965) 3, 59-63. This article describes preparation of a CMS, from a polyvinylidene chloride (PVDC) copolymer, that rejects neopentane (6.0 Å) molecules, but adsorbs smaller molecules, such as, in non-limiting example, $CO_2$, butane, and iso-butane, non-selectively. In view of this the authors of that article concluded that their CMS had 6 Å micropores.

Another example is disclosed in Fuertes A. B., et al., "Molecular sieve gas separation membranes based on poly (vinylidene chloride-co-vinyl chloride)," *Carbon* (2000) 38, 1067-1073. This article describes preparation of a composite carbon membrane using the aforesaid material. The membrane is formed with a thin microporous carbon layer (thickness of 0.8 micrometers, μm) obtained by pyrolysis of the polymeric film, supported over a macroporous carbon substrate (pore size 1 μm; macroporosity 30 percent, %). Single gas permeation experiments include helium (He), $CO_2$, oxygen ($O_2$), nitrogen ($N_2$) and methane ($CH_4$). Selectivities are described as particularly high for $O_2/N_2$ systems, i.e., a selectivity of about 14 at 25 degrees Celsius (°C.). From this information it can be inferred that the micropore size falls somewhere in a range from the representative molecular diameter of $O_2$ (3.46 Å) to that of $N_2$ (3.64 Å). This CMS membrane is prepared by pre-treating the supported film at 200°C., a temperature at which the PVDC copolymer precursor is melted before carbonization. The fact that melting is required means that the disclosed CMS structures cannot be prepared in unsupported forms.

In other research, including for example, Laredo G. C., Meneses E., Castillo J., Marroquin J. O, Jimeenez-Cruz F., "Adsorption equilibrium and kinetics of branched octane isomers on a polyvinylidene chloride-based carbon molecular sieve," *Energy Fuels* (2008) 22 (4) 2641-2648, polyvinylidene chloride copolymer-based CMSs have been prepared that exhibit relatively large micropore sizes and pore volumes that are suitable for separation of correspondingly large molecules, i.e., those having a representative molecular diameter greater than 5.0 Å. However, previous researchers have not identified polyvinylidene chloride copolymer-based CMSs that are capable of effectively and/or efficiently separating gas pairs of much smaller molecules, such separations including, in non-limiting examples, $C_3H_8/C_3H_6$, $C_2H_6/C_2H_4$, and/or $CH_4/N_2$.

It will thus be seen that the prior art does not identify a carbonized PVDC having an average micropore size, as defined, that is suitable for small molecule separations, i.e., particularly of molecules having representative molecular diameters ranging from 3.0 Å to 5.0 Å. Furthermore, the prior art does not disclose a process for preparing carbonized PVDC CMSs that can be easily and precisely tailored to a variety of separations of molecules in this representative molecular diameter range, and which, in particular embodiments, also exhibit a stable geometry, whether as granules, pellets, un-supported film, un-supported membrane, woven fiber sheets, or the like.

In one embodiment the present invention provides a molecular sieve composition comprising carbonized polyvinylidene chloride copolymer and having micropores having an average micropore size ranging from 3.0 Å to 5.0 Å.

In another embodiment the present invention provides a molecular sieve composition as defined in the previous paragraph prepared by a process comprising pyrolyzing a polyvinylidene chloride copolymer precursor at an attained maximum pyrolysis temperature in degrees Celsius ranging from 800 to 1700, wherein the precursor has a crystallinity percentage, as measured by differential scanning calorimetry, ranging from 25 to 75, to obtain the molecular sieve composition further characterized according to the equation $$\sigma = 6.09 + (0.0275 \times C) - (0.00233 \times T) \quad \text{(Equation 1)}$$

wherein σ is the average micropore size in Angstroms, C is the precursor crystallinity percentage, and T is the attained maximum pyrolysis temperature.

In still another embodiment the present invention provides a molecular sieve composition as defined in the previous paragraph that is further characterized as having an average micropore volume according to the equation $$V = 0.346 + 0.00208 \times C - 0.000152 \times T \quad \text{(Equation 2)}$$

wherein V is the average micropore volume in milliliters per gram, C is the precursor crystallinity percentage, and T is the attained maximum pyrolysis temperature in degrees Celsius, provided C is from 25 to 75 and T is from 800 to 1700.

In yet another embodiment the present invention provides a process for separating two gases in a mixture thereof, comprising contacting a mixture of two gases, wherein at least one gas has a representative molecular diameter ranging from 3.0 Å to 5.0 Å, and the defined molecular sieve composition, under conditions suitable to adsorb, in the micropores of the molecular sieve composition, at least 5 weight percent (wt %) of the at least one gas, under conditions such that the at least 5 wt % of the at least one gas is separated from the other gas; and then desorbing the at least one gas.

In general the present invention provides carbon molecular sieve (CMS) absorbents that are useful for a variety of separations. Such separations may include, but are not necessarily limited to, the following pairs of gases wherein at least one molecule, and in some embodiments both molecules, has/have a representative molecular diameter falling within the 3.0 Å to 5.0 Å range: Propylene ($C_3H_6$) and propane ($C_3H_8$); carbon dioxide ($CO_2$) and nitrogen ($N_2$); $N_2$ and methane ($CH_4$); ethylene ($C_2H_4$) and ethane ($C_2H_6$); and n-butane ($C_4H_{10}$) and i-butane ($C_4H_{10}$). The inventive molecular sieves may be conveniently used in the formation of pellets, films, fibers, monoliths, and/or sheets such as woven sheets, and in certain particular embodiments may be conveniently used in packed beds or other typical separations systems, and particularly in separations systems based upon, for example, pressure or temperature swing principles.

The CMSs of the invention may be conveniently prepared from a vinylidene chloride copolymer, comprising a vinylidene chloride monomer and at least one additional comonomer. The comonomer may be selected from a variety of materials, including in particular embodiments a vinyl monomer, vinyl chloride monomer, an acrylate monomer, a methacrylate monomer, a styrenic monomer, acrylonitrile, methacrylonitrile, itaconic acid, chlorotrifluoroethylene, and combinations thereof. In more particular embodiments examples of the vinyl monomers include vinyl chloride, vinyl acetate, acrylonitrile, and combinations thereof. More particular examples of the acrylate monomers include methyl acrylate, ethyl acrylate, butyl acrylate, and combinations thereof. More particular examples of methacrylate monomers include methyl methacrylate, butyl methacrylate, and combinations thereof. A more particular example of styrenic monomers is styrene itself.

In proportion it is preferred that the vinylidene chloride based copolymer, which is herein termed a polyvinylidene copolymer (PVDC), includes at least 60 wt % of vinylidene chloride, based on total weight of the copolymer, and in more preferred embodiments at least 70 wt %. However, it is further desired that the PVDC contains a maximum of 97 wt % vinylidene chloride, and thus preferably contains a minimum of at least 3 wt % of the comonomer or comonomer combination; more preferably from 3 wt % to 40 wt %; still more preferably from 3 wt % to 30 wt %; and most preferably from 3 wt % to 20 wt %.

Particular embodiments of PVDCs that are suitable for use in the invention are those including as a comonomer an acrylate, such as methyl acrylate, ethyl acrylate, butyl acrylate, or a combination thereof, in an amount from 3 wt % to 20 wt %, based on the weight of the PVDC as a whole; more preferably from 3.5 wt % to 15 wt %; and most preferably from 4 wt % to 12 wt %. Another particular embodiment is a PVDC including vinyl chloride in an amount from 3 wt % to 30 wt %; more preferably from 7 wt % to 28 wt %; and most preferably from 9 wt % to 25 wt %.

It is also preferred that the overall weight average molecular weight (Mw) of the PVDC copolymer ranges from 10,000 to 250,000; more preferably from 50,000 to 200,000; and most preferably from 60,000 to 150,000.

Use of additives in the PVDC is also contemplated as being within the scope of the invention. Common additives may include, but are not necessarily limited to, epoxidized oil stabilizers such as expoxidized soybean oil, expodized linseed oil, and the diglycidyl ether of bisphenol A. Also frequently employed are liquid plasticizers such as aliphatic and aromatic esters, including for example dibutyl sebacate, acetyl tributyl citrate, dioctyl phthalate, and the like, and combinations thereof. Other common additives may include lubricants, such as polyethylene wax, paraffin wax, oxidized polyethylene wax, and combinations thereof. Lubricants may optionally be included, and may comprise, for example, high density polyethylene, acrylate copolymers and silicone polymers, and combinations thereof. Another group of additives that may be included are acid scavengers such as epoxy compounds, magnesium hydroxide, magnesium oxide, tetrasodium pyrophosphate, calcium phosphate, magnesium phosphate, DHT 4A (a synthetic hydrotalcite-like halogen scavenger available from Kyowa Chemical Industry), calcium oxide, calcium carbonate, and combinations thereof. Antioxidants such as phenolics may also be incorporated. Combinations of any or all of these types of additives may be included in the PVDC.

In proportion, it is preferred that the total amount of all additives combined be no more than 8 wt %, and more preferably no more than 3 wt %. In many applications, however, an amount of all additives combined of at least 2 wt % may be typical, with use thereof therefore ranging preferably from 2 wt % to 8 wt %, and more preferably from 2 wt % to 3 wt %. Those skilled in the art will be aware of the use of such additives and their indications and contraindications without further direction herein.

Those skilled in the art will also be aware of a variety of means and methods for preparing copolymers. However, in general any of the typical or conventional methods of polymerization, including but not limited to mass polymerization, suspension polymerization, and emulsion polymerization, and preferably suspension polymerization or emulsion polymerization, may be employed. It is generally preferred that polymerization is carried out at a temperature that ensures avoidance of degradation of all of the PVDC components, e.g., preferably from 10° C. to 120° C.; more preferably from 20° C. to 100° C.; and most preferably from 30° C. to 90° C.

Following completion of the copolymerization, the PVDC may be allowed to remain in its as-polymerized form, e.g., typically beads, and/or may be melt-extruded in order to form the PVDC into a thin film or fiber. In particular embodiments the as-polymerized resin (e.g., beads) or melt-extruded film or fiber precursor material has a maximum thickness ranging from 10 µm to 1000 µm; preferably from 20 µm to 500 µm; and more preferably from 50 µm to 200 µm. Where films are desired, a conventionally known preparation process such as a blown film process, for example, a double bubble process or a cast film tentering process, may be especially useful to produce a biaxially oriented film. It is more preferred that a double bubble process be employed in order to concurrently extrude, biaxially orient, and anneal the PVDC film. Fibers may be produced by uniaxial stretching using known fiber processes for PVDC copolymers, and may be round, shaped, hollow, or a combination thereof, or of any other desired fiber morphology. It is also contemplated that precursor films and/or fibers may be coextruded with multiple PVDC copolymers and/or with other polymers.

It is noted that either the film or fiber preparation process may optionally include stretching, such as stretching of the resin to form a melt-extruded film or fiber. This stretching may, in particular embodiments, be particularly effective in inducing more rapid crystallization and in increasing, and therefore improving, alignment of the PVDC crystallites. Desirably the stretch ratio ranges from 1 to 8, more desirably from 1 to 6, still more desirably from 1 to 4, and most desirably from 2 to 4.

In general it is important to the invention that the copolymer precursor, whether in its as-polymerized form (e.g., beads) or following melt-extrusion into a film or fibers, exhibits a desirable level of crystallinity. In the present invention this crystallinity ranges from 25% to 75%, as measured by differential scanning calorimetry (DSC) according to ASTM D3418. It is more preferred that this level ranges from 30% to 55%, and most preferred that this level ranges from 35% to 50%. While discussion of the significance of the crystallinity of the copolymer, which serves as a precursor to the carbonized microporous composition ultimately used for separations purposes, is set forth in greater detail hereinbelow, it is noted at this point that, surprisingly, it has been found that ensuring a given level of crystallinity within the designated range is a key to obtaining the desired average micropore size and average micropore volume, following the pyrolysis, in the final CMS. It is noted that homopolymerized PVDC generally exhibits an as-polymerized crystallinity greater than 75%, and that it has surprisingly been found to be significant that the PVDC be either copolymerized with an adequate amount of at least one of the listed monomers, or melt-extruded (with or without stretching), or both, in order to ensure the designated level of precursor (i.e., pre-pyrolysis) crystallinity (i.e., from 25% to 75%) specified herein. Thus, inclusion of a comonomer generally helps to reduce precursor crystallinity to ensure the desired range, and also to reduce the melt temperature and thereby improve processability of the resulting copolymer. In general, inclusion of bulkier monomers may tend to reduce overall copolymer crystallinity by a greater amount than inclusion of less bulky monomers. Thus, for example, butyl acrylate will tend to reduce crystallinity more than, for example, methyl acrylate or ethyl acrylate, assuming such is/are used in the same mole percent (mol %) based on final copolymer composition.

The next step in preparing the CMS adsorbent compositions of the present invention is preferably a pre-treatment that may be employed to stabilize, or "lock," the copolymer structure prior to carbonization thereof. In this step the as-polymerized beads or the extruded film or fiber, termed as "precursor" materials at this point, are/is heated, below the melting temperature thereof (typically less than about 180° C., depending upon the exact composition of the precursor), in order to at least 10% dehydrochlorinate them/it. As used herein, the term "at least 10% dehydrochlorinated" means that the beads, film or fiber have/has been pre-treated, by removing hydrogen chloride, to a point at which the copolymer precursor no longer melts and, in fact, begins to become infusible. It is well-accepted in the art that such a change in molecular kinetics begins to occur at a point of approximately 10% dehydrochlorination and is completed or maintained as the level of dehydrochlorination increases above that point. This step is termed a "pre-treatment" because it occurs prior to a pyrolysis step, which is the treatment step wherein carbonization is accomplished.

During the pre-treatment the copolymer structure's temperature is preferably maintained in a range of from 100° C. to 180° C., more preferably from 120° C. to 160° C., and most preferably from 130° C. to 150° C. This is preferably done in air for convenience, but other atmospheres, such as $N_2$ and other inert gases or oxidizing gases such as $CO_2$, or combinations thereof, may also or alternatively be used, since generally only minor levels of oxidation of the copolymer are anticipated within the overall given temperature range. Achievement of the desired dehydrochlorination, that is responsible for the formation of the locked structure, may be accomplished by exposure to a source of high energy irradiation, such as gamma rays, an electron beam, ultraviolet light, or a combination thereof. The time may vary from 1 hour (hr) to 48 hr, preferably from 1 hr to 24 hr, and most preferably from 1 hr to 12 hr, as needed to reach the at least 10% dehydrochlorination point, at which the copolymer begins to become infusible, i.e., no longer able to be melted. The dehydrochlorination degree can vary from 10% to 100%, depending upon pretreatment temperature and time. While it is desirable that substantially all of the copolymer be dehydrochlorinated to the desired extent, it will be recognized that presence of a minor amount, desirably less than 2% by weight, of precursor that is not at least 10% dehydrochlorinated may be acceptable. Where more than visual confirmation of the beginning of infusibility is desired, additional confirmation of the percentage of dehydrochlorination may be obtained by means of, for example, Thermo Gravimetric Analysis (TGA), using standard and well-known methods and equipment.

Following the dehydrochlorination pre-treatment, the as-polymerized copolymer, typically still in the form of beads, film or fiber, now termed the pre-treated beads, pre-treated film or pre-treated fiber, or alternatively pre-treated CMS material, is pyrolyzed. Preferably such pyrolysis results in at least 90 wt % of the copolymer becoming carbonized, more preferably at least 95 wt %, and most preferably at least 99 wt %. As already pointed out hereinabove, this pyrolysis is also termed "carbonization," because the result thereof is that the copolymer is converted to the carbon-only, or near carbon-only, skeleton of its copolymer structure, i.e., all or virtually all atoms other than carbon have been removed, but the carbon-carbon bonds remain substantially intact, and the CMS may now be termed to be "carbonaceous." The pyrolysis may be carried out using any means generally known to those skilled in the art, but may be carried out at an attained maximum temperature within the range of from 800° C. to 1700° C., more preferably from 1000° C. to 1500° C., and most preferably from 1100° C. to 1300° C. More particularly, however, the pyrolysis temperature is an important aspect of the present invention, as explained further hereinbelow.

A particular and important advantage of the present invention is that an average micropore size, within a range from 3.0 Å to 5.0 Å, may be preselected according to a desired separation utility. Pre-selection of the desired average micropore size can then be correlated with a known and/or also preselected precursor (pre-pyrolysis) crystallinity of the precursor material and an attained maximum pyrolysis temperature in order to obtain a molecular sieve composition having the desired average micropore size, through use of a surprisingly discovered relationship represented by the equation $$\sigma = 6.09 + (0.0275 \times C) - (0.00233 \times T) \quad \text{(Equation 1)}$$

wherein $\sigma$ is the average micropore size in Angstroms, ranging from 3.0 Å to 5.0 Å; $C$ is the precursor's crystallinity percentage; and $T$ is the attained maximum pyrolysis temperature in degrees Celsius; provided that the crystallinity ranges from 25% to 75% and the attained maximum pyrolysis temperature ranges from 800° C. to 1700° C. It will be understood that the crystallinity percentage is expressed as a rational number greater than zero, e.g., the number representing 45% crystallinity that will be inserted into Equation 1 will be 45, and not 0.45. Discovery of this surprising characterization relationship enables convenient and precise preparation or production of the desired small pore microporous compositions, and therefore also facilitates the various desired gas separations for which the inventive microporous compositions may be used. TABLE 1 illustrates the relationships reflected by the equation.

TABLE 1

| Attained Maximum Pyrolysis Temperature (° C.) | Precursor Crystallinity (%) | | | | | |
|---|---|---|---|---|---|---|
| | 25 | 35 | 45 | 55 | 65 | 75 |
| 800 | 4.9 | 5.2* | 5.5* | 5.7* | 6.0* | 6.3* |
| 900 | 4.7 | 5.0 | 5.2* | 5.5* | 5.8* | 6.1* |
| 1000 | 4.4 | 4.7 | 5.0 | 5.3* | 5.5* | 5.8* |
| 1100 | 4.2 | 4.5 | 4.8 | 5.0 | 5.3* | 5.6* |
| 1200 | 4.0 | 4.3 | 4.5 | 4.8 | 5.1* | 5.4* |
| 1300 | 3.7 | 4.0 | 4.3 | 4.6 | 4.8 | 5.1* |
| 1400 | 3.5 | 3.8 | 4.1 | 4.3 | 4.6 | 4.9 |
| 1500 | 3.3 | 3.6 | 3.8 | 4.1 | 4.4 | 4.7 |
| 1600 | 3.0 | 3.3 | 3.6 | 3.9 | 4.1 | 4.4 |
| 1700 | 2.8* | 3.1 | 3.4 | 3.6 | 3.9 | 4.2 |

*indicates average micropore sizes larger than 5.0 Å or smaller than 3.0 Å.

As will be seen from TABLE 1, as the attained maximum temperature rises, the window of effective crystallinity, that is required to assure that a final average micropore size in the 3.0 Å to 5.0 Å range is obtained, correspondingly narrows. For example, at 800° C., crystallinity must be approximately 25% in order to obtain an average micropore size within the 3.0 Å to 5.0 Å range. However, at 1400° C., crystallinity may be anywhere from 25% to 75% to ensure the given average micropore size range, and at 1700° C., crystallinity may be anywhere from 35% to 75%. It is noted, however, that crystallinities significantly higher than 75% may require such high attained maximum pyrolysis temperatures, in order to produce a CMS having a pore size at or slightly below 5.0 Å, that they are to be considered to be effectively impractical. Furthermore, such high crystallinities may even prevent formation of micropores that are significantly smaller than 5.0 Å, i.e., closer to 3.0 Å, even at attained maximum pyrolysis temperatures in excess of 1700° C.

As is also seen from TABLE 1, preselection of the precise desired average micropore size is possible simply by knowing or selecting the crystallinity of the precursor and then employing an attained maximum pyrolysis temperature that, in concert with the known or selected crystallinity, will produce the desired average micropore size.

In addition to average micropore size, it is also often desirable in the art to optimize total micropore volume, which may be measured via the Brunauer-Emmett-Teller (BET) method at liquid $N_2$ temperature. Such may be further confirmed via helium (He) adsorption and mercury (Hg) intrusion. For most separations applications, a total micropore volume of at least 0.10 mL/g, preferably at least 0.15 mL/g, more preferably at least 0.20 mL/g, according to the BET method at liquid $N_2$ temperature, is needed to ensure commercially efficient desirable gas adsorption. Again, the present invention provides, in certain particular embodiments, a process whereby a composition exhibiting a preselected property, i.e., a preselected micropore volume, may be prepared. In this case the same two parameters, i.e., crystallinity percentage of the precursor and attained maximum pyrolysis temperature, may also or alternatively be used in order to preselect, or to otherwise predict or characterize, the micropore volume of the composition following pyrolysis. The relationship between these three aspects is represented by the equation $$V = 0.346 + 0.00208 \times C - 0.000152 \times T \quad \text{(Equation 2)}$$

wherein V is the average micropore volume in milliliters per gram (mL/g), C is the precursor crystallinity percentage, and T is the attained maximum pyrolysis temperature in degrees Celsius, provided that C is from 25% to 75% and T is from 800° C. to 1700° C.

It will be understood from Equation 2 that any reduction of precursor crystallinity (again, as in Equation 1, inserted into Equation 2 as a rational number greater than zero) will decrease the micropore volume in the resultant CMS. However, a relatively lower crystallinity, within the 25% to 75% range, in the precursor may be preferred in order to obtain a composition having the desired average micropore size within the 3.0 Å to 5.0 Å range via pyrolysis at a relatively lower temperature within the 800° C. to 1700° C. range. This leads to the conclusion that average micropore volume and average micropore size are desirably balanced, and that a relatively narrower range of crystallinities, preferably ranging from 35% to 55%, may often be preferred for industrial manufacturing processes wherein desirable operating maximum pyrolysis temperatures are rarely higher than 1200° C. It is noted that, while it is desirable in many cases to address both average micropore size and average micropore volume concurrently, those skilled in the art will recognize that combining the two equations (Equation 1 and Equation 2) into a single equation would require an assumption that there is a standard micropore geometry, an assumption that may not be correct in any given system and which may therefore introduce undesirable error into the calculation. Thus, application of the two individual equations to any given system is preferable.

In the present invention, overall average micropore volume may also be increased in particular embodiments by applying tension to the film or fiber, during pre-treatment, pyrolysis, or both. This tension is preferably applied to maintain the film or fiber at its greatest exhibited dimension, or at some percentage thereof, prior to pre-treatment and/or pyrolysis. For example, it may be desirable to apply sufficient tension to maintain the film or fiber at, for example, 80%, or 75%, or 90% of the greatest dimension exhibited by the fiber prior to its pre-treatment and/or pyrolysis. Such tension may range from 0.01 MPa to 10 MPa, preferably from 0.1 to 1 MPa, and most preferably from 0.1 to 0.5 MPa.

It is of particular note that average micropore size and/or average micropore volume of the inventive compositions seem to suffer little, if any, alteration when additional factors, including but not limited to ramp rate to reach the attained maximum pyrolysis temperature, and/or hold time at the attained maximum pyrolysis temperature, are introduced and/or considered. For example, for industrial purposes, ramp rates ranging from 2° C./min to 10° C./min are typical, and hold times may range from 0 minutes (min) (i.e., ramping to the attained maximum temperature followed by immediate active or passive temperature reduction) up to 60 min (i.e., holding at the attained maximum pyrolysis temperature for up to 60 min prior to active or passive temperature reduction) are typical. However, when the inventive compositions are prepared under conditions wherein these parameters are altered, the average micropore size and/or average micropore volume may still be reliably preselected or predicted according to the given characterization equations.

Following pyrolysis, one embodiment of the inventive CMS compositions, having an average micropore size ranging from 3.0 Å to 5.0 Å, is complete. In particular embodiments thereof, the average micropore size ranges from 4.0 Å to 4.3 Å, and is thus capable of admitting propylene molecules while excluding propane molecules. In another preferred embodiment the average micropore size ranges from 3.7 Å to 4.1 Å, and is thus capable of admitting ethylene molecules while excluding ethane molecules. In still another preferred embodiment, the average micropore size ranges from 3.64 Å to 3.8 Å, and is thus capable of admitting nitrogen molecules while excluding methane molecules. In yet another preferred embodiment, the average micropore size ranges from 3.0 Å to 3.64 Å, and is thus capable of admitting carbon dioxide molecules while excluding nitrogen molecules. In still another preferred embodiment, the average micropore size ranges from 4.3 Å to 5.0 Å, and is thus capable of admitting n-butane molecules while excluding iso-butane molecules. Thus, the inventive compositions are particularly desirable for these particular separations, but may, in other non-limiting embodiments, be useful in certain other separations.

The final CMS will generally appear as a finely divided powder having a Brunauer-Emmett-Teller (BET) surface area ranging from 300 μm, preferably from 30 μm to 300 μm. As will be well-known to those skilled in the art, however, such powders may be unsuitable for uses in typical separations applications, such as in conventional packed beds including, for example, fixed beds. This is because packing geometries may, in such applications, be sufficiently dense to seriously inhibit flow-through and thereby create unacceptable transit times and pressure drops.

In order to counter these problems, the inventive CMSs may be used as the basis to form CMS pellets or CMS woven fiber sheets or monoliths that offer significantly more convenient handling, as well as greatly enhanced structural integrity, when compared to powders. In some embodiments such pellets or woven fiber sheets may also offer more easily controlled and desirable transit times. Such may be prepared in a variety of ways that may be, or will become henceforth, known to those skilled in the art. In certain particularly preferred embodiments, however, the following inventive processes have been found to be particularly effective.

In the case of the pyrolyzed CMS beads, fiber or film, such may be first ground to an average particulate size ranging from 10 μm to 300 μm, preferably from 20 μm to 200 μm, and most preferably from 30 μm to 100 μm. Grinding may be carried out using conventional grinding equipment, including, for example, a laboratory scale mortar and pestle, or commercial grinding equipment such as, but not limited to, a jet mill or an impact mill. The pyrolyzed, ground CMS fiber or film may be then combined with a binder. This binder may be, in certain embodiments, a cellulosic binder, such as cellulose itself, or a cellulose ether or cellulose ester. In one embodiment it may be methyl cellulose. In certain embodiments a proportion of water is also included with the binder, in order to form a paste. It is therefore desirable in general that the binder be a relatively hydrophilic material, which is defined herein as referring to a binder that is more attracted to the water than it is to the ground CMS film or fiber, such that coating or pore-filling of the CMS film or fiber by the binder is reduced or minimized. This helps to avoid at least some of the reduction in average micropore volume that can result from such coating or pore-filling, and is the reason that the desirable binder is defined herein as a substantially "non-coating" binder. "Substantially" as used herein means that there is less than a 10% reduction, preferably less than a 5% reduction, and more preferably less than a 2% reduction, in average micropore volume, in comparison with the average micropore volume of the ground CMS film or fiber without the presence of any binder. Thus, without wishing to be bound by any theory, it is speculated that in the binder/ water/CMS system, the CMS material may be relatively hydrophobic, which contributes to the "non-coating" activity of the binder/water combination. At the same time, the binder as employed herein preferably provides structural integrity and mechanical strength to the pellet after the water is removed therefrom.

In proportion it is desirable that the weight ratio, of the non-coating binder to the pyrolyzed, ground CMS beads, fiber or film in the paste, is less than 0.5:1, more preferably less than 0.25:1, and most preferably less than 0.05:1. The binder/water ratio is preferably in the range of from 1:10 to 1:3, to ensure that the paste may be conveniently extruded.

Once a suitable binder formulation is prepared, it may be preferably ram extruded to form any desired shape, but for many purposes an essentially linear shape is convenient. Ram extrusion enables formation of relatively large pellets while not significantly reducing the non-coating binder's ability to minimize water migration while imparting high post-extrusion wet strength. It is desirable that the final pellets exhibit a relatively narrow length distribution and a diameter ranging preferably from 1 millimeter (mm) to 10 mm, more preferably from 2 mm to 5 mm. The diameter/length aspect ratio preferably ranges from 1:1 to 1:5. It is noted that extrusion through a conventional 5 mm die may result in relatively elongated pellets which may then be conveniently cut to the desired lengths, which are at that point suitable to be dried, for example in a drying oven at a temperature ranging from 50° C. to 100° C., for a time ranging from 1 hr to 24 hr, to form mechanically strong CMS-containing pellets. It is preferable that the pellets themselves exhibit a macroporosity, i.e., presence of pores having an average diameter greater than 50 nanometers (nm), ranging from 10 percent by volume (vol %) to 50 vol %, more preferably from 20 vol % to 40 vol %, and most preferably from 25 vol % to 35 vol %.

In an alternative embodiment, a useful CMS configuration may be prepared by first forming PVDC precursor fibers via melt-extrusion, as previously described, having the given preferred approximate thickness, cross-sectional diameters, or widths, as applicable, i.e., ranging from 10 μm to 1000 μm, preferably from 20 μm to 500 μm, and most preferably from 30 μm to 300 μm. In separate embodiments these precursor fibers may be either first woven together to form a woven sheet, then pre-treated as described hereinabove, and finally pyrolyzed to form a woven fiber adsorbent; or the precursor fibers may be first pre-treated, then the pre-treated fibers woven to form a woven fiber sheet, and finally the woven fiber sheet is pyrolyzed to form the woven fiber adsorbent. Of these two embodiments it is frequently preferred to first weave the precursor fibers, prior to pre-treatment, since the pre-treatment tends to make the fibers more rigid and therefore more difficult to weave thereafter. Either approach may enable inclusion of desired levels of voids, also referred to as macrovoids or macropores (i.e., having average diameters greater than 50 nm), wherever the fibers cross one another, which may serve a role that is equivalent to that offered by packing geometries of pellets, i.e., to ensure desirable mass transport speed and therefore a desirable performance for relatively large scale packed bed applications. In some embodiments it is desirable that the total void space represented by such a woven fiber sheet range from 10 vol % to 50 vol %, more desirably from 20 vol % to 40 vol %, and most desirably from 25 vol % to 35 vol %, as measured by mercury porosimetry. A suitable method for this is described in, for example, Liu J., Han C, McAdon M., Goss J., Andrews K., "High throughput development of one carbon molecular sieve for many gas separations," *Microporous Mesoporous Mater.* (2015) 206, 207-216, which is incorporated herein by reference in its entirety. It is noted that these preferred void volume ranges substantially correlate with the preferred macroporosity ranges for the pellets.

Once the CMS pellet structure or woven fiber sheet structure has been prepared and pyrolysis is completed, it is ready to be used in an actual separations process. However, it should be understood that it is alternatively possible to use the pyrolyzed CMS powder (that has not been pelletized or formed into a woven fiber sheet structure) for separatory purposes as described hereinbelow. Those skilled in the art will be well-versed as to means and methods to prepare a packed bed or column, or to make a laminar adsorbent structure comprising woven fiber sheets, through which the desired mixture of gases may be passed to accomplish separation thereof. As noted, a particular, but non-limiting, mixture of gases which may be conveniently separated in the present invention is a mixture comprising $C_3H_6$ and $C_3H_8$. In this case the mixture and the CMS structure may be contacted under conditions suitable to adsorb at least 5 wt %, preferably at least 8 wt %, more preferably at least 10 wt %, of at least a first gas (in this case, $C_3H_6$), such that the first gas is separated from at least a second gas (in this case, $C_3H_8$); recovering the second gas ($C_3H_8$); desorbing the first gas ($C_3H_6$); and finally recovering the first gas ($C_3H_6$). A similar approach may be used with an unlimited number of other pairs of gases, having differentiated representative molecular diameters such that at least one of which falls within the 3.0 Å to 5.0 Å range, and wherein the average micropore size of the CMS has been selected to fall somewhere between the two different representative molecular diameters. This separation may be effectively accomplished using traditional pressure swing techniques, where adsorption and desorption cycles are alternated. Other means may include, for example, temperature swing adsorption processes, and adsorption of one gas, for example, of propylene from the propylene/propane mixture, followed by desorption, which is accomplished via purging with an inert gas. In particular embodiments it is desirable that the separation factor of the selected gases be at least 10, preferably at least 20, more preferably at least 40, and most preferably at least 50.

EXAMPLES 1-17 AND COMPARATIVE EXAMPLES 1-16

A series of example (ES) and comparative (CS) samples are prepared from polyvinylidene chloride that is copolymerized with a monomer selected from methyl acrylate (MA), ethyl acrylate (EA), or butyl acrylate (BA), the monomer being present in each case in an amount shown in TABLE 2. In each case the copolymerization is accomplished by suspension polymerization. In general this includes mixing the selected monomers according to their weight ratio with a polymerization initiator and then carrying out the polymerization reaction in a water dispersion. The copolymer powder is then dried to remove water and any unreacted monomers. The powder is then sieved and the 30-50 U.S. mesh portion thereof is selected, to ensure uniformity, for the CMS preparation.

The precursor powder is then dehydrochlorinated to pre-treat it, at a temperature of 130° C. for 24 hr, followed by 150° C. for 24 hr, in an oven purged by 2 liters per minute (L/min) of air.

Following the dehydrochlorination pre-treatment, the pre-treated powder is then pyrolyzed in a three-stage pyrolysis procedure. The first stage includes loading 300 gram (g) samples of vinylidene chloride resin (copolymer) into a low temperature oven. A scrubber connected to this oven contains a 10 wt % sodium hydroxide aqueous solution. The loaded oven is first heated at a ramp rate of 1° C./min to 130° C. and held for 24 hr, then heated at a ramp rate of 1° C./min to 150° C. and held for 24 hr under 2 L/min of air purge, before cooling to an ambient temperature.

Next, the second stage of pyrolysis includes loading the precursor powder into a cubic foot retort furnace. A scrubber connected to this furnace contains a 10 wt % sodium hydroxide aqueous solution. The loaded furnace is heated to 650° C. at a ramp rate of 5° C./min and held for 15 min, under 2 L/min of nitrogen, before cooling to an ambient temperature.

A third stage of pyrolysis is then carried out in a graphite furnace. Samples of the precursor powder (10 g each) from the second stage processing in the retort furnace are loaded, in turn, in a graphite boat measuring 4 inches by 4 inches by 0.5 inch (4"×4"×0.5"). The boat containing each sample is heated according to the conditions shown for the inventive and comparative samples in TABLE 2, with a 10 L/min of nitrogen purge (one volume turnover every 12 min). After completion of the third stage of pyrolysis for each, the furnace is cooled at a ramp rate of 10° C./min to 450° C., below which the furnace is allowed to cool to ambient temperature at a slower rate due to the heat transfer limitations.

TABLE 2 also shows the properties of the CMS compositions formed based upon six process variables: 1) Attained maximum pyrolysis temperature; 2) Hold time at attained maximum pyrolysis temperature; 3) Ramp rate to attained maximum pyrolysis temperature; 4) Comonomer type; 5) Comonomer content; and 6) Precursor crystallinity. The overall micropore volume is measured using a $N_2$ BET t-plot method, which is typically used in the art.

The average micropore size, alternatively termed the effective micropore size or the average effective micrropore size, is also measured, using a kinetic adsorption method using multiple probe molecules. To estimate the effective micropore size of each CMS adsorbent, first, all pairs of the probe gases with selectivity higher than 10 are determined for each CMS adsorbent. For each gas pair having a selectivity greater than or equal to 10, the smallest molecule rejected and the largest molecule adsorbed are selected as the defining molecule pair. Then, the average of this defining molecule pair's representative molecular diameters is taken to be the effective micropore size of that particular CMS adsorbent.

For example, the smallest and the largest gas molecules that are rejected and accepted by the Example 1 (EX 1) adsorbent are $C_3H_8$ (4.3 Å) and $C_2H_6$ (4.1 Å), respectively. Consequently, the effective micropore size of the EX 1 adsorbent is estimated and understood to be 4.2 Å.

TABLE 2

CMS preparation parameters and properties

| Sample (EX or CS #) | Temp. [° C.]* | Hold Time** [min] | Ramp rate [° C./-min] | Comonomer | Comonomer content [mol %] | Crystallinity*** [%] | Micropore volume [mL/g] | Effective micropore size[Å] |
|---|---|---|---|---|---|---|---|---|
| CS 1 | 1075 | 30 | 6 | MA | 8.4 | 53 | 0.309 | 5.8 |
| CS 2 | 950 | 30 | 6 | EA | 6.7 | 63 | 0.342 | 5.8 |
| CS 3 | 700 | 30 | 2 | BA | 5 | 70 | 0.334 | 5.8 |
| CS 4 | 950 | 60 | 10 | BA | 5 | 70 | 0.338 | 5.8 |
| CS 5 | 1075 | 60 | 2 | EA | 5 | 71 | 0.313 | 5.8 |
| CS 6 | 950 | 0 | 2 | MA | 8.4 | 53 | 0.260 | 5.8 |
| CS 7 | 1200 | 30 | 10 | MA | 5 | 71 | 0.383 | 5.8 |
| CS 8 | 700 | 60 | 10 | EA | 8.4 | 46 | 0.340 | 5.8 |
| CS 9 | 1200 | 0 | 2 | EA | 6.7 | 63 | 0.318 | 5.2 |
| CS 10 | 825 | 30 | 10 | BA | 8.4 | 37 | 0.271 | 5.2 |
| EX 1 | 1200 | 60 | 6 | BA | 8.4 | 37 | 0.246 | 4.2 |
| CS 11 | 825 | 60 | 2 | MA | 6.7 | 65 | 0.363 | 5.8 |
| CS 12 | 1075 | 0 | 10 | BA | 6.7 | 45 | 0.293 | 5.2 |
| CS 13 | 700 | 0 | 6 | MA | 6.7 | 65 | 0.371 | 6.2 |
| CS 14 | 825 | 0 | 6 | EA | 5 | 71 | 0.367 | 5.8 |
| ES 2 | 1250 | 30 | 6 | EA | 8.4 | 46 | 0.292 | 4.6 |
| ES 3 | 1025 | 30 | 6 | BA | 8.4 | 37 | 0.276 | 4.2 |
| ES 4 | 1200 | 30 | 6 | BA | 8.4 | 37 | **** | 4.2 |
| ES 5 | 1575 | 30 | 6 | EA | 6.7 | 63 | **** | 4.2 |
| ES 6 | 1450 | 30 | 6 | EA | 6.7 | 63 | 0.242 | 4.2 |
| CS 15 | 1200 | 30 | 6 | MA | 6.7 | 65 | 0.324 | 5.2 |
| ES 7 | 1450 | 30 | 6 | BA | 8.4 | 37 | **** | 3.4 |
| ES 8 | 1575 | 30 | 6 | MA | 8.4 | 53 | 0.204 | 4.2 |
| ES 9 | 1450 | 30 | 6 | MA | 5 | 71 | 0.300 | 4.6 |
| ES 10 | 1700 | 30 | 6 | BA | 6.7 | 45 | **** | 3.5 |
| ES 11 | 1200 | 30 | 6 | BA | 8.4 | 37 | 0.204 | 4.0 |
| ES 12 | 1700 | 30 | 6 | MA | 5 | 71 | 0.176 | 4.2 |
| ES 13 | 1325 | 30 | 6 | BA | 6.7 | 45 | 0.249 | 4.2 |
| ES 14 | 1700 | 30 | 6 | EA | 8.4 | 46 | **** | 3.3 |
| ES 15 | 1325 | 30 | 6 | MA | 8.4 | 53 | 0.312 | 4.6 |
| ES 16 | 1575 | 30 | 6 | BA | 5 | 70 | 0.182 | 3.7 |
| CS 16 | 1200 | 30 | 6 | EA | 5 | 71 | 0.346 | 5.2 |
| ES 17 | 1325 | 30 | 6 | EA | 5 | 71 | 0.317 | 4.6 |

*Attained maximum pyrolysis temperature
**Hold time at attained maximum pyrolysis temperature
*** Crystallinity of precursor (i.e., of pre-pyrolysis composition)
****Micropore volume too low to measure by $N_2$ BET method.

EXAMPLE 18

Four (4) example samples (EX), denoted as ES 1, ES 6, ES 8 and ES 13, shown in TABLE 2 as having an effective micropore size of 4.2 Å, are used for an experiment to compare high throughput kinetic adsorption in separations of propylene and propane. To calculate selectivity, the formula shown in Equation (3) is used.

$$\text{Alpha-}PD = \frac{t_{0.5\ C3H8}}{t_{0.5\ C3H6}} \times \frac{\Delta P_{C3H6}}{\Delta P_{C3H8}} \quad \text{(Equation 3)}$$

In the equation "ΔP" represents the pressure drop (from the 45 psi, 0.31 MPa, starting pressure to the equilibrium pressure) due to adsorption, which is proportional to the amount of adsorption according to the ideal gas law. The half time adsorption ("t0.5") represents the time at which 50% of the pressure drop (adsorption) happens, which corresponds to the diffusion speed. The selectivity ("Alpha-PD") is defined in the following equation to take into consideration both the equilibrium and kinetic selectivities. Results for the four example samples tested are shown in TABLE 3.

TABLE 3

$C_2H_4/C_2H_6$ kinetic adsorption summary of CMS samples: ES 1, 6, 8 and 13

| Sample | Δ P C3H6 [psi*] | t0.5 C3H6 [min] | Δ P C3H8 [psi*] | t 0.5 C3H8 [min] | Alpha-PD | Micropore volume [cm³/g] |
|---|---|---|---|---|---|---|
| ES 1 | 33.1 | 4.4 | 5.3 | 100 | 142 | 0.246 |
| ES 6 | 27.3 | 4.9 | 12.7 | 53 | 23 | 0.242 |
| ES 8 | 27.8 | 6.3 | 5.8 | 95 | 72 | 0.204 |
| ES 13 | 27 | 5.4 | 7.3 | 60 | 41 | 0.249 |

*1 psi = approximately 0.007 MPa

It is noted that researchers have previously believed that Zeolite 4A, with an effective micropore size of about 4.2 Å, offered the best potential for use in propylene/propane separations. However, the micropore volume of Zeolite 4A is known to be 0.20 mL/g. See, for example, Da Silva F. A., Rodrigues A. E., "Adsorption Equilibria and Kinetics for Propylene and Propane over 13× and 4 A Zeolite Pellets," *Ind. Eng. Chem. Res.* (1999) 38, 2051-2057, which is incorporated herein by reference in its entirety. Thus, certain embodiments of the present invention may offer significant increases in micropore volume, and higher volume generally results in higher throughput. It is also noted that "effective micropore size" refers to pore sizes that are effective to result in separation, but such may offer greater or lesser rates of diffusion dependent in part upon geometry.

EXAMPLE 19

An ethylene/ethane selectivity measurement is carried out using ES 11 in a high throughput kinetic adsorption. The results of this separation are shown in TABLE 4. These results show that, not only ethane adsorbs to a much lesser extent in the inventive CMS than ethylene, due to the pressure drop resulting from the adsorption, it also adsorbs much more slowly, by a factor of about 10. Thus, the two molecules can be easily and effectively separated using the inventive compositions.

TABLE 4

$C_2H_4/C_2H_6$ kinetic adsorption summary of CMS sample: ES 11

| Δ P C2H4 [psi*] | t0.5 C2H4 [min] | Δ P C2H6 [psi*] | t 0.5 C2H6 [min] | Alpha-PD[–] |
|---|---|---|---|---|
| 31.3 | 3.4 | 16.6 | 27.8 | 15 |

*1 psi = approximately 0.007 MPa

EXAMPLE 20

A nitrogen/methane selectivity measurement is carried out using ES 16 in a high throughput kinetic adsorption. The results of this separation are shown in TABLE 5. These results show that, although the nitrogen adsorbs to a lesser extent than methane, due to the pressure drop resulting from the adsorption, it adsorbs almost 40 times faster than the methane. Thus, the inventive CMS composition provides an effective kinetic separation of these two molecules.

TABLE 4

$N_2/CH_4$ kinetic adsorption summary of CMS sample: ES 16

| Δ P N2 [psi*] | t0.5 N2 [min] | Δ P CH4 [psi*] | t 0.5 CH4 [min] | Alpha-PD [–] |
|---|---|---|---|---|
| 9.4 | 0.5 | 15.9 | 18.3 | 22 |

*1 psi = approximately 0.007 MPa

EXAMPLE 21

A selectivity measurement of propane (representative of a linear chain paraffin) and iso-butane (representative of a branched chain paraffin) is carried out using ES 15 in a high throughput kinetic adsorption. The results of this separation are shown in TABLE 6. These results show that the propane adsorbs both to a greater extent and also almost 4 times faster than the iso-butane. Thus, the inventive CMS composition provides an effective separation of these two molecules. Furthermore, it is noted that, because the micropore volume of this CMS (i.e., 0.312 mL/g) is significantly higher than that of Zeolite 5A (i.e., 0.198 mL/g), currently being utilized for certain commercial linear/branched chain paraffin separations, such as n-butane/i-butane separations, the inventive CMS may offer a comparative and significant advantage.

TABLE 6

$C_3H_8/i\text{-}C_4H_{10}$ kinetic adsorption summary of CMS sample: ES 15

| Δ P C3H8 [psi*] | t0.5 C3H8 [min] | Δ P i-C4H10 [psi*] | t 0.5 i-C4H10 [min] | Alpha-PD [–] | Micropore volume [cm³/g] |
|---|---|---|---|---|---|
| 25.5 | 5.3 | 0.8 | 28 | 168 | 0.312 |

*1 psi = approximately 0.007 MPa

EXAMPLES 22-24

Three exemplary melt extruded copolymer tapes, designated as ES 22, ES 23, and ES 24, comprising vinylidene chloride monomer and, as comonomers therewith, methyl acrylate (MA) 4.8 wt %, MA 8.5 wt % or vinyl chloride (VC) 17.6 wt %, respectively, are prepared. Approximately 5 g of PVDC tapes are laid down on aluminum (Al) pans and allowed to shrink freely during the pre-treatment step. The PVDC films are kept in a one-cubic-foot oven purged by approximately 10 L/min of air. The oven temperature is raised to 130° C. with a 1° C./min ramp and held for 24 hr, then raised to 150° C. with a 1° C./min ramp rate and held for another 24 hr, before cooling to an ambient temperature. The crystallinity of each of the tapes is shown in TABLE 7. As compared to the crystallinity of the as-polymerized resins in TABLE 2, the crystallinity in the tapes after melt extrusion is reduced by an amount ranging from 10% to 30%.

TABLE 7

Crystallinity of various PVDC precursors

| Precursor # | Copolymer (morphology) | Crystallinity [%] |
|---|---|---|
| ES 22 | MA 4.8 wt % (melt extruded tape) | 50 |
| ES 23 | MA 8.5 wt % (melt extruded tape) | 38 |
| ES 24 | VC 17.6 wt % (melt extruded tape) | 35 |

Samples of approximately 2 g each of pre-treated films are loaded into a one-inch diameter quartz tube furnace. The tube furnace loaded with the resin samples is then raised from 550° C. to 1000° C. at a ramp rate of 5° C./min or 10° C./min, respectively, to finish the HCl releasing reaction. The carbonized film obtained from the first step of pyrolysis is then put into an ASTRO™ furnace (ASTRO is a trademark of Astro Thermal Tec Ltd.) with electrical heating, water cooling, and argon (Ar) purging. The temperature is raised from 1000° C. to the final temperature (i.e., attained maximum temperature) of 1500° C. at a 10° C./min ramp, and held at the final temperature for 15 min. The pyrolysis conditions are shown in the names of samples as follows: ramp-final temperature-hold time. Thus, for example, the notation "5C-1000-15 min" defines a 5° C./min ramp, final temperature of 1000° C., and hold time of 15 min during pyrolysis.

The high throughput kinetic adsorption is performed in a high throughput reactor (HTR) system installed in a triple dry box. Adsorbate gases (propylene $C_3H_6$ and propane $C_3H_8$) can be injected into each cell at a controlled pressure and temperature. The kinetic adsorption measurements are performed in the following sequence: (1) Load approximately 0.5 g of CMS sample into the 14 cm³ high throughput cells; (2) de-gas at 140° C. for 4 hr by a semi-continuous $N_2$ purge; (3) introduce the $C_3H_6$ gas to a pressure of 45 pounds per square inch (psi, 0.31 MPa) and monitor the pressure drop for 8 hr at 35° C.; (4) de-gas at 140° C. for 24 hr by $N_2$ purge; and (5) introduce the $C_3H_8$ gas to 45 psi (0.31 MPa) pressure and monitor the pressure drop for 96 hr at 35° C.

TABLE 8 shows the high throughput kinetic adsorption results on the pyrolyzed carbon tapes. Because each of the adsorption cells contains (1) the same amount of CMS adsorbent (0.5 g); (2) the same volume (14 milliliters, mL); and (3) is pressurized to the same 45 pounds per square inch (psi, 0.31 MPa) initial pressure; the pressure drop (ΔP) is, therefore, an indicator of the amount of gas adsorbed by the adsorbent. The results show that, for the CMS adsorbents prepared from the same precursor type, ΔP of $C_3H_6$ and $C_3H_8$ is approximately the same at low pyrolysis temperature. ΔP of both adsorbate gases increases slightly and then decreases as the pyrolysis temperature increases. When pyrolyzed at 1500° C., the CMS film from the MA 4.8 wt % precursor shows $C_3H_6/C_3H_8$ selectivity as high as 50. Also, when pyrolyzed at above 1000° C., the CMS films from both MA 8.5 wt % and VC 17.6 wt % precursor show some $C_3H_6/C_3H_8$ selectivity.

From the above results, then, it may be concluded that propylene/propane selective materials may be more conveniently prepared in the form of melt-extruded tapes than in the form of as-polymerized resins because the melt-extruded tapes may be pyrolyzed at a lower temperature than the resins to achieve comparable selectivity. The final pyrolysis temperature for the MA 4.8 wt % resin decreases from approximately 1700° C. for as-polymerized resin to approximately 1500° C. in the melt-extruded tape. Similarly, the final pyrolysis temperature for the MA 8.6 wt % resin decreases from approximately 1300° C. for as-polymerized resin to approximately 1000° C. in the melt extruded tape. This shows that melt extrusion reduces crystallinity of PVDC copolymers, which in turn enables the formation of propylene/propane selective micropores at lower pyrolysis temperatures.

TABLE 8

$C_3H_6/C_3H_8$ kinetic adsorption summary of CMS films

| Tape-Composition-Ramp rate-Pyrolysis temperature-Pyrolysis time | Δ P C3H6 [psi**] | t0.5 C3H6 [min] | Δ P C3H8 [psi**] | t 0.5 C3H8 [min] | Alpha-PD [-] |
|---|---|---|---|---|---|
| SARAN* Tape-MA 4.8 wt %-5° C.-850-15 min | 17 | 7 | 16 | 8 | 1 |
| SARAN Tape-MA 4.8 wt %-10° C.-1000-15 min | 18 | 5 | 17 | 5 | 1 |
| SARAN Tape-MA 4.8 wt %-10° C.-1200-15 min | 20 | 3 | 19 | 5 | 2 |
| SARAN Tape-MA 4.8 wt %-10° C.-1500-15 min | 18 | 19 | 6 | 300 | 50 |
| SARAN Tape-MA 8.5 wt %-5° C.-800-15 min | 16 | 5 | 14 | 4 | 1 |
| SARAN Tape-MA 8.5 wt %-5° C.-900-15 min | 17 | 4 | 14 | 4 | 1 |
| SARAN Tape-MA 8.5 wt %-5° C.-1000-15 min | 17 | 3 | 14 | 38 | 18 |
| SARAN Tape-MA 8.5 wt %-5° C.-1000-60 min | 16 | 3 | 13 | 36 | 18 |
| SARAN Tape-VC 17.6 wt %-10° C.-1000-15 min | 14 | 3 | 13 | 3 | 1 |
| SARAN Tape-VC 17.6 wt %-10° C.-1200-15 min | 6 | 67 | 3 | 246 | 7 |
| SARAN Tape-VC 17.6 wt %-10° C.-1500-15 min | 2 | 125 | 1 | 450 | 6 |

*SARAN is a trademark of The Dow Chemical Company
**1 psi = approximately 0.007 MPa

EXAMPLES 25-41

Two types of 0.28 millimeter (mm) diameter CMS fibers (obtained from SATTI™, Germany, and denoted as "Doll Hair" due to the fact that the largest application for the fiber is hair used in children's toy dolls) are pretreated according to two methods: Method A, wherein the fiber is maintained at constant length during the pre-treatment step, and Method B, wherein the fiber is allowed to shrink freely during the pre-treatment step. Both methods are carried out under the same temperature profiles as shown in Example 1. It is noted that the fiber always breaks in the middle of pre-treatment when attempts are made to maintain constant length. The broken fibers then shrink similarly to those left to shrink freely. The crystallinity of the precursor fibers is shown in TABLE 9.

TABLE 9

Crystallinity of the 0.28 mm PVDC fiber

| Copolymer (morphology) | Crystallinity [%] |
|---|---|
| MA 4.8 wt % (0.28 mm fiber) | 47 |

The fibers are then subjected to pyrolysis at different temperatures. TABLE 10 shows the kinetic adsorption results of the fibers corresponding to pyrolysis at each temperature. There is a pyrolysis temperature window ranging from approximately 850° C. to 1000° C. for both types of CMS fibers to reach an optimal $C_3H_6/C_3H_8$ selectivity. The temperature window is significantly lower than the 1500° C. pyrolysis temperature that is required for the CMS film, despite the fact that both fibers and film are prepared from the same MA 4.8 wt % precursor. The major difference between the film and fibers is in their respective crystalline morphologies, which depend heavily upon the melt extrusion process employed. The 4.8 wt % MA film is extruded with a negligible amount of stretch applied and left to crystallize slowly over an approximately two-day timeframe. In contrast, when a stretch ratio as high as 4 is used to melt spin fibers, the crystallization process happens in the timeframe of a few seconds. It is noted that the crystallites in the stretched fiber are generally much smaller and more highly aligned than those in films, even though the crystallinity levels in the film and fiber precursors are approximately the same, as shown in TABLE 7 and TABLE 9. Without wishing to be bound by any theory, it is speculated that the increased alignment of crystallites in the precursor, due to stretching, may reduce crosslinking and, upon pyrolysis, increase graphitization, which may in turn result in the need for, or tolerance of, a lower pyrolysis temperature. The lower pyrolysis temperature for CMS fiber generation also results in a more economical pyrolysis production process for scale-up purposes.

TABLE 10

$C_3H_6/C_3H_8$ high throughput kinetic adsorption summary for CMS fibers

| Example | Method-Morphology-Atmosphere-Tension/no tension-Ramp rate-temperature-Pyrolysis time | Δ P C3H6 [psi] | t0.5 C3H6 [min] | Δ P C3H8 [psi] | t 0.5 C3H8 [min] | Alpha [–] |
|---|---|---|---|---|---|---|
| ES 25 | A-Doll Hair-Air-tension-5 C.-550-15 min | 17 | 3 | 14 | 7 | 3 |
| ES 26 | A-Doll Hair-Air-tension-5 C.-700-15 min | 17 | 4 | 14 | 6 | 2 |
| ES 27 | A-Doll Hair-Air-tension-5 C.-850-15 min | 19 | 5 | 12 | 55 | 19 |
| ES 28 | A-Doll Hair-Air-tension-5 C.-900-15 min | 19 | 8 | 12 | 738 | 138 |
| ES 29 | A-Doll Hair-Air-tension-5 C.-950-15 min | 19 | 7 | 13 | 593 | 134 |
| ES 30 | A-Doll Hair-Air-tension-5 C.-1000-15 min | 16 | 20 | 11 | 483 | 36 |
| ES 31 | A-Doll Hair-Air-tension-10 C.-1100-15 min | 19 | 12 | 4 | 105 | 38 |
| ES 32 | A-Doll Hair-Air-tension-10 C.-1200-15 min | 18 | 26 | 6 | 228 | 26 |
| ES 33 | A-Doll Hair-Air-tension-10 C.-1500-15 min | 3 | 92 | 2 | 294 | 4 |
| ES 34 | B-Doll Hair-Air-no tension-5 C.-550-15 min | 17 | 4 | 15 | 5 | 1 |
| ES 35 | B-Doll Hair-Air-no tension-5 C.-700-15 min | 19 | 4 | 16 | 7 | 2 |
| ES 36 | B-Doll Hair-Air-no tension-5 C.-850-15 min | 19 | 13 | 11 | 692 | 88 |
| ES 37 | B-Doll Hair-Air-no tension-5 C.-900-15 min | 20 | 8 | 14 | 332 | 55 |
| ES 38 | B-Doll Hair-Air-no tension-5 C.-950-15 min | 20 | 13 | 9 | 733 | 124 |
| ES 39 | B-Doll Hair-Air-no tension-5 C.-1000-15 min | 17 | 20 | 10 | 486 | 41 |
| ES 40 | B-Doll Hair-Air-no tension-10 C.-1100-15 min | 18 | 5 | 9 | 19 | 7 |
| ES 41 | B-Doll Hair-Air-no tension-10 C.-1200-15 min | 18 | 5 | 11 | 67 | 21 |

EXAMPLE 42

CMS fiber is obtained by pyrolyzing a 170 μm outside diameter (OD) vinylidene chloride/methyl acrylate copolymer fiber (SARAN™, obtained from FUGAFIL™ in Germany), using the two step process described hereinbelow. Composition and crystallinity of the precursor fiber are shown in TABLE 11.

TABLE 11

Crystallinity of the 0.17 mm PVDC fiber

| Copolymer (morphology) | Crystallinity [%] |
|---|---|
| MA 4.8 wt % (0.17 mm fiber) | 51 |

In a pre-treatment step, 100 g of PVDC fiber is preheated in a convection oven in air at 130° C. for one day and at 150° C. for another day, to form stabilized CMS precursor. The pre-treated fiber is then pyrolyzed to 550° C. under an $N_2$ purge (5° C./min ramp, hold for 15 min at 550° C.) to complete the chemical decomposition. The CMS fiber is denoted as "0.17 mm CF," with "CF" meaning "carbon fiber." The CMS fiber obtained is then ground to an average particle size ranging from 30 μm to 200 μm.

EXAMPLE 43

A paste is made by manually mixing three components: 10 g of ground CMS fiber (Example 42), 1 g of METHOCEL™ A4M (METHOCEL is a trademark of The Dow Chemical Company), and 10 g of deionized (DI) water. The paste is extruded through a 5 mm die and cut into approximately 5 mm short cylindrical pellets. The pellets are dried in an $N_2$-purged oven at 50° C. overnight. The pellet is denoted as "10% Methocel-0.17 mmCF," with "%" representing wt %.

EXAMPLE 44

CMS fiber is prepared using the protocol of Example 42, except that the paste components include 5 g of METHOCEL™ A4M. Further processing is continued as in Example 43, with the final pellet sample being denoted as "50% Methocel-0.17 mmCF."

The gravimetric transient adsorptions of CMS fiber and the pellet adsorbents prepared in Example 42, 43, 44 are carried out in a modified thermogravimetric analysis (TGA) instrument. Approximately 200 milligrams (mg) of CMS material is loaded into a TGA pan and heated to 90° C. (at 10° C./min ramp and hold time of 30 min) under 25 standard cubic centimeters per minute (sccm) of helium (He) purge. The He purge gas is then switched to 25 sccm of mixture gas containing 50 mole percent (mol %) of He and 50 mol % of $C_3H_6$. The weight gain of the samples (due to the adsorption of $C_3H_6$) over time is recorded. The $C_3H_6$ capacity is recorded as the percentage of weight gain at equilibrium compared to the fresh CMS samples. The half time adsorption is the time required to reach 50% of the equilibrium weight change, which is used as a parameter for the rate of kinetic adsorption. The results are shown in TABLE 12.

TABLE 12

Propylene capacity and half time adsorption into CMS fiber and pellets

| Example | Carbon Fiber (CF) composition | Propylene capacity [wt %] | Half time adsorption [min] |
| --- | --- | --- | --- |
| ES 42 | 017 mm CF (non-pellet) | 8.2 | 0.8 |
| ES 43 | 10% Methocel-0.17 mm CF (pellet) | 8.2 | 1.3 |
| ES 44 | 50% Methocel-0.17 mm CF (pellet) | 6.1 | 1.0 |

Results show that a significant variation in the amount of cellulose ether (10 wt % versus 50 wt % METHOCEL™) does not significantly reduce the diffusion speed of $C_3H_6$. In fact, the diffusion into the pellet is closely similar to diffusion into the 0.17 mm CMS fiber that has not been pelletized at all. The fact that mass transport speed does not appear to be significantly affected by either the fact of pelletization, or by the proportion of binder when the CMS adsorbent has been pelletized, is unexpected. Without wishing to be bound by theory, it is speculated that the highly hydrophilic nature of the cellulose ether, i.e., the fact it is non-coating when employed in combination with the hydrophobic CMS fiber or film, may result in preservation of a void-filled interface that ensures effective mass transport.

EXAMPLES 46-47

One type of SARAN™ woven cloth (obtained from FUGAFIL™, Germany, denoted as "SARAN cloth") is pre-treated under similar temperature profiles as described in Example 34-41. The SARAN™ cloth is left to shrink freely during the pre-treatment and the subsequent pyrolysis step according to the maximum attained pyrolysis temperatures shown in TABLE 13.

Testing includes TGA kinetic adsorption testing using $C_3H_6$, and $C_3H_8$. For the kinetic adsorption testing, first, approximately 200 mg of the cloth is loaded into a TGA pan and heated to 90° C. (at 10° C./min ramp and hold time of 30 min) under 25 sccm of He purge. The He purge gas is then switched to 25 sccm of mixture gas containing 50 mol % of He and 50 mol % of $C_3H_6$. Then 200 mg of the fresh sample is loaded into a TGA pan and heated to 90° C. (at 10° C./min ramp and hold time of 30 min) under 25 sccm of He purge. The He purge gas is then switched to 25 sccm of mixture gas containing 50 mol % of He and 50 mol % of $C_3H_8$. For separation based on kinetic adsorption, a cycle time to reach 50% equilibrium of the faster gas ($C_3H_6$) is desirable to maximize the selectivity. Therefore, selectivity in this gravimetric method (Alpha-G) is defined as the ratio of weight gain for $C_3H_6$ and $C_3H_8$ at the half time for adsorption of $C_3H_6$.

TABLE 13 shows the kinetic adsorption results for cloth samples that have been carbonized by pyrolysis to different temperatures. There is a temperature window ranging from 1100° C. to 1200° C. to form CMS with propylene/propane selective pores, which is similar to that found in the SARAN fiber derived CMS.

TABLE 13

$C_3H_6/C_3H_8$ high throughput kinetic adsorption summary of CMS Cloth

| Example | Pyrolysis temperature [° C.] | Propylene capacity [wt %] | t0.5 propylene [min] | Alpha-G [—] |
| --- | --- | --- | --- | --- |
| 46 | 1100 | 9.6 | 11.3 | 13 |
| 47 | 1200 | 2 | 15.8 | 100 |

The invention claimed is:

1. A molecular sieve composition comprising unsupported carbonized polyvinylidene chloride copolymer prepared by a process comprising pyrolyzing an unsupported polyvinylidene chloride polymer precursor having a precursor crystallinity percentage at an attained maximum pyrolysis temperature, wherein the molecular sieve composition has micropores having an average micropore size ranging from 3.0 Å to 4.3 Å, wherein the average micropore size of the molecular sieve composition further characterized according to the equation $$\sigma = 6.09 + (0.0275 \times C) - (0.00233 \times T)$$

wherein σ is the average micropore size in Angstroms, C is the precursor crystallinity percentage, and T is the attained maximum pyrolysis temperature, wherein the precursor has a crystallinity percentage, as measured by differential scanning calorimetry, ranging from 25 to 75%.

2. The molecular sieve composition of claim 1, wherein the attained maximum pyrolysis temperature in degrees Celsius is from 1000 to 1500.

3. The molecular sieve composition of claim 2 being further characterized as having an average micropore volume according to the equation $$V = 0.346 + 0.00208 \times C - 0.000152 \times T$$

wherein V is the average micropore volume in milliliters per gram.

4. The molecular sieve composition of claim 2 wherein the polyvinylidene chloride polymer precursor is pre-treated, prior to pyrolysis, to at least 10 percent dehydrochlorinate it, to form a pre-treated precursor.

5. The molecular sieve composition of claim 4 wherein the polyvinylidene chloride copolymer precursor is prepared by polymerization or melt-extrusion to form a precursor bead, a precursor film or a precursor fiber, the polyvinylidene chloride copolymer precursor optionally comprising vinylidene chloride and at least one additional monomer selected from a vinyl monomer, a vinyl chloride monomer, an acrylate monomer, a methacrylate monomer, a styrenic monomer, acrylonitrile, methacrylonitrile, itaconic acid, chlorotrifluoroethylene, and mixtures thereof, and the melt-extrusion being optionally carried out at a stretch ratio from 1 to 8, the precursor bead, the precursor film or the precursor fiber optionally having an average thickness or average cross-sectional diameter or average width, as applicable, ranging from 10 micrometers to 1000 micrometers.

6. The molecular sieve composition of claim 4 wherein the pre-treatment is carried out at a temperature ranging from 100° C. to 180° C. for a time ranging from 1 hour to 48 hours, and optionally, in the case of the precursor film or the precursor fiber, applying tension, simultaneously with the pre-treatment, in an amount from 0.01 megapascals to 10 megapascals.

7. The molecular sieve composition of claim 5 further comprising weaving the precursor fiber to form a precursor woven sheet, prior to pyrolysis; and pre-treating the precursor woven sheet either before or after weaving;

wherein the pyrolysis of the precursor woven sheet forms a woven fiber adsorbent being characterized as having voids representing from 10 percent to 50 percent, as measured by mercury porosimetry, of the total volume thereof.

8. The molecular sieve composition of claim 1 further comprising grinding the pyrolyzed molecular sieve composition to form particles having an average size ranging from 10 micrometers to 1000 micrometers;

combining the particles with at least a non-coating binder and water to form a pellet precursor material; and pelletizing the pellet precursor material to form a structured pellet adsorbent.

9. The molecular sieve composition of 1 being used to separate a mixture selected from
    (a) propane and propylene;
    (b) nitrogen and methane;
    (c) ethane and ethylene;
    (d) carbon dioxide and nitrogen; and
    (e) n-butane and iso-butane;
    the molecular sieve composition having been prepared such that it has an average micropore size that is suitable to enable separation of the selected mixture.

10. A process for separating two gases in a mixture thereof, comprising contacting a mixture of two gases, wherein at least one gas has a representative molecular diameter ranging from 3.0 Å to 5.0 Å, and the molecular sieve composition of claim 1, under conditions suitable to adsorb, in the micropores of the molecular sieve composition, at least 5 weight percent of the at least one gas, under conditions such that the at least 5 weight percent of the at least one gas is separated from the other gas; and then desorbing the at least one gas.

* * * * *